US008582635B2

(12) United States Patent
Prokop et al.

(10) Patent No.: US 8,582,635 B2
(45) Date of Patent: Nov. 12, 2013

(54) SPARSE AND RECONFIGURABLE FLOATING TAP FEED FORWARD EQUALIZATION

(75) Inventors: Tomasz Prokop, Pleasanton, CA (US); Chaitanya Palusa, Fremont, CA (US)

(73) Assignee: LSI Corporation, Milpitas, CA (US)

( * ) Notice: Subject to any disclaimer, the term of this patent is extended or adjusted under 35 U.S.C. 154(b) by 0 days.

(21) Appl. No.: 13/410,473

(22) Filed: Mar. 2, 2012

(65) Prior Publication Data

US 2013/0230092 A1    Sep. 5, 2013

(51) Int. Cl.
*H03H 7/30* (2006.01)
(52) U.S. Cl.
USPC ........... 375/229; 375/230; 375/232; 375/233; 375/346; 375/350; 455/296; 455/501; 370/335; 370/342; 333/18; 333/28 R; 708/300; 327/551

(58) Field of Classification Search
USPC ................ 375/229, 230, 232, 233, 346, 350; 455/296, 501; 370/335, 342; 333/18, 333/28 R; 708/300; 327/551
See application file for complete search history.

(56) References Cited

U.S. PATENT DOCUMENTS

2009/0016422 A1*  1/2009  Zhong et al. ................... 375/233
2011/0142120 A1*  6/2011  Liu et al. ........................ 375/233

* cited by examiner

*Primary Examiner* — Leon Flores

(57) ABSTRACT

In described embodiments, a Floating Tap, Feed Forward Equalizer (FT-FFE) achieves performance comparable to a full size, long FFE when equalizing wire line channels in, for example, SerDes receivers. A FT-FFE might be employed as a standalone datapath equalizer, or might be employed in conjunction with other equalization techniques.

11 Claims, 3 Drawing Sheets

SPARSE AND RECONFIGURABLE FLOATING TAP FEED FORWARD EQUALIZATION

BACKGROUND OF THE INVENTION

In many data communication applications, serializer and de-serializer (SerDes) devices facilitate the transmission between two points of parallel data across a serial link. Data at one point is converted from parallel data to serial data and transmitted through a communications channel to the second point where it received and converted from serial data to parallel data.

At high data rates frequency-dependent signal loss from the communications channel (the signal path between the two end points of a serial link), as well as signal dispersion and distortion, can occur. Ideally, without noise, jitter, and other loss and dispersion effects, a data eye at the receiver will exhibit a relatively ideal shape. In practice, the shape of the data eye changes with noise, jitter, other loss and dispersion effects, and temperature and voltage variations. As such, the communications channel, whether wired, optical, or wireless, acts as a filter and might be modeled in the frequency domain with a transfer function. Correction for frequency dependent losses of the communications channel, and other forms of signal degradation, often requires signal equalization at a receiver of the signal.

Equalization through use of one or more equalizers compensates for the signal degradation to improve communication quality. Equalization may also be employed at the transmit side to pre-condition the signal. Equalization, a form of filtering, generally requires some estimate of the transfer function of the channel to set its filter parameters. However, in many cases, the specific frequency-dependent signal degradation characteristics of a communications channel are unknown, and often vary with time. In such cases, an equalizer with adaptive setting of parameters providing sufficient adjustable range might be employed to mitigate the signal degradation of the signal transmitted through the communications channel. Equalization might be through a front end equalizer, a feedback equalizer, or some combination of both. The shape of the data eye also changes due to equalization applied to input signal of the receiver. In some systems, equalization applied by a transmitter's equalizer further alters the shape of the eye from the ideal.

If a simple, analog front-end equalizer (AFE) is employed, the data eye operating margin improves. However, better performance might be achieved through use of a Decision Feedback Equalizer (DFE) in combination with an AFE. Classical DFE equalization optimizes for an ISI and opens up the vertical and horizontal data eye opening. DFE filters play an important role in SerDes communication channels. The DFE filtering is employed to cancel post-cursor inter symbol interference (ISI) in the equalized channel's pulse response. The output of a DFE filter is subtracted from an input signal; The DFE filter includes a number of taps, which number determines how well the post-cursor ISI might be cancelled. The longer the filter length (i.e., the more filter taps), the more ISI terms might be cancelled, but at the expense of increasing DFE filter length complexity and power consumption of a given implementation. Typically, the DFE coefficients are automatically adjusted with adaptive algorithms such as least mean square (LMS). In high speed applications the data path equalization components are most often implemented as analog, transistor level circuits and the adaptation is implemented as digital blocks.

An alternative approach implements only an ADC as an analog circuit, and all other processing of the received signal is implemented fully in the digital domain. Such DSP data path offers better reliability, testability and flexibility, but presents implementation challenges due to lower clock speeds available in digital designs, leading to a need for greater parallelization of the DSP processing.

One of the main equalization components, the DFE, is particularly difficult to parallelize due to its inherent feedback structure.

In a fully digital SerDes receiver the equalization data path is fully implemented as digital blocks and typically follows a Variable Gain Amplifier (VGA) and an Analog to Digital Converter (ADC) at the input. A typical digital data path comprises a Feed Forward Equalizer (FFE), a DFE and adaptation and calibration circuits. For a digital implementation, the clock frequencies available in the receive data path would be an order of magnitude, for example 8-16×, lower that in case of the analog datapath equalization. To maintain the data rate through the receiver, the receiver data path is parallelized by the same factor (8-16×). DFE implementations do not parallelize efficiently due to the need of an immediate feedback from the previous bit to the next bit of processed data. To address this architectural feature in parallel implementations of the DFE, an unrolling technique may be used, but this yields prohibitively large designs for practical applications, scaling exponentially with the number of tap coefficients. For 6-10 DFE taps needed, the size/power cost is prohibitive.

In order to avoid the huge size/power penalty of a large parallelized DFE, a Feed Forward Equalizer (FFE) might be used in place of a traditional DSP-implemented DFE, or in addition to a DFE with fewer taps, making the data path easier to parallelize and implement for very fast data rates. In order to cover all the significant ISI contributing positions in a given channel the delay line of the FFE might typically span several tens of signal samples (symbols) e.g., 40-50 samples). A parallel FFE implementation having several taps on such a long delay line is relatively complex, and has high power consumption.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, the present invention allows for applying equalization to a set of samples of an input signal representing data symbols. A set of delays are coupled in series and configured to receive the set of samples of input signal, the set of delays comprising a fixed-tap group and a floating tap group. A fixed feed-forward equalizer stage (FFE) applies a set of fixed filter taps to the fixed-tap sample group to generate a corresponding set of partial results; and at least one floating FFE stage applies an associated set of floating filter taps to selected ones of the floating-tap sample group to generate a corresponding set of partial results. The partial results of the fixed FFE stage are combined with the partial results of each corresponding floating FFE stage to generate a set of floating taps feed forward (FT-FFE)-equalized samples of the input signal.

BRIEF DESCRIPTION OF THE DRAWINGS

Other aspects, features, and advantages of the present invention will become more fully apparent from the following BRIEF DESCRIPTION OF DRAWINGS (continued)

DETAILED DESCRIPTION

In accordance with exemplary embodiments of the present invention, a Feed Forward Equalizer (FFE) might be employed in place of a Decision Feedback Equalizer (DFE), or in addition to a DFE with fewer taps, making a receiver's data path easier to parallelize and implement for very fast data rates. An FFE in accordance with embodiments of the present invention is sparse and reconfigurable. As employed herein, "sparse" is defined as relatively fewer non-zero tap coefficients than for the whole FFE delay line of signal samples; and "reconfigurable" is defined as the positions of the existing tap coefficients may be adjusted in response to, for example, estimation of the ISI contributing positions in a given channel.

Figure 1:
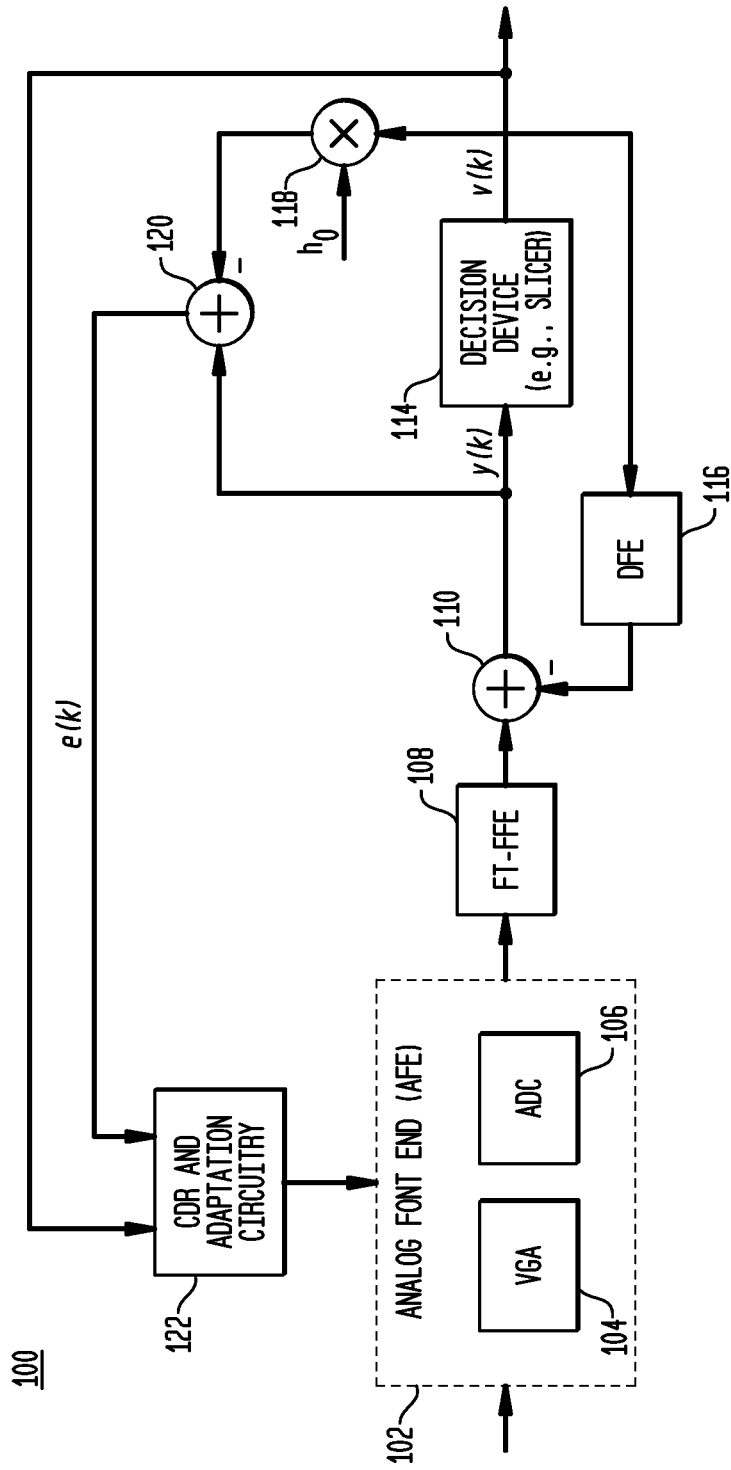
FIG. 1 shows a serializer-deserializer (SerDes) receiver incorporating a sparse, floating tap feed-forward equalizer (FT-FFE) operating in accordance with an exemplary embodiment of the present invention.

FIG. 1 shows serializer-deserializer (SerDes) receiver 100 incorporating sparse, floating tap feed-forward equalizer (FT-FFE) 108 operating in accordance with an exemplary embodiment of the present invention. SerDes receiver 100 comprises analog front end (AFE) 102 having variable gain amplifier 104 that applies gain to the input received signal, and analog to digital converter (ADC) 106 that provides digital conversion of the input analog signal for processing by, for example, a digital signal processing (DSP) implementation of the SerDes receiver. The ADC samples and digitizes the analog signal under timing and control of clock and data recovery circuitry (CDR circuitry, not shown in the figure) that is based on recovered symbol timing of the received signal's data symbols. The digitized input signal is then filtered with sparse, floating tap feed-forward equalizer (FT-FFE) 108, whose operation is described subsequently below. As shown, FT-FFE 108 applies equalization in conjunction with decision feedback equalization (by decision feedback equalizer (DFE) 116), although other embodiments of the present invention might employ only FT-FFE 108. If employed, the feedback signal from DFE 116 is subtracted from the filtered input signal in combiner 110. Consequently, combiner 110 provides samples y(k), that are then applied to a decision device (such as a slicer or comparator) that, based on an input threshold, generates data decision v(k) corresponding to input sample y(k).

Data decisions v(k) are then provided to DFE 116 (if present) that generates a feedback signal constructed based on an estimate of inter-symbol and other interference (ISI). The DFE filter includes one or more filter taps that are estimated and adapted based on an error signal e(k) generated from the difference between a weighted data decision v(k) and the corresponding input sample y(k). Weighting by $h_0$, based on an estimate of the first coefficient of the channel transfer function, occurs by multiplier 118, and the error signal e(k) is generated as the difference between the weight decision $h_0 v(k)$ and the input sample y(k) by combiner 120.

The error signal is employed by CDR and adaptation circuitry 122 to maintain and track recovered symbol timing for sampling, as well as to update and adapt parameters of the various filters (coefficients and taps) of FT-FFE 108 and DFE 116.

In accordance with exemplary embodiments of the present invention, a sparse, reconfigurable FFE combines a first, fixed parallel stage (termed a "fixed FFE" herein) operating on a first set of a sequence of data samples, followed by one or more floating parallel stages (termed a "floating FFE" herein) operating on selected sets of the sequence of data samples that are, in general, earlier in time than the data samples processed by the fixed FFE. Since each parallel stage operates in an analogous manner, an exemplary eight-way parallel FT-FFE stage is now described.

Figure 2:
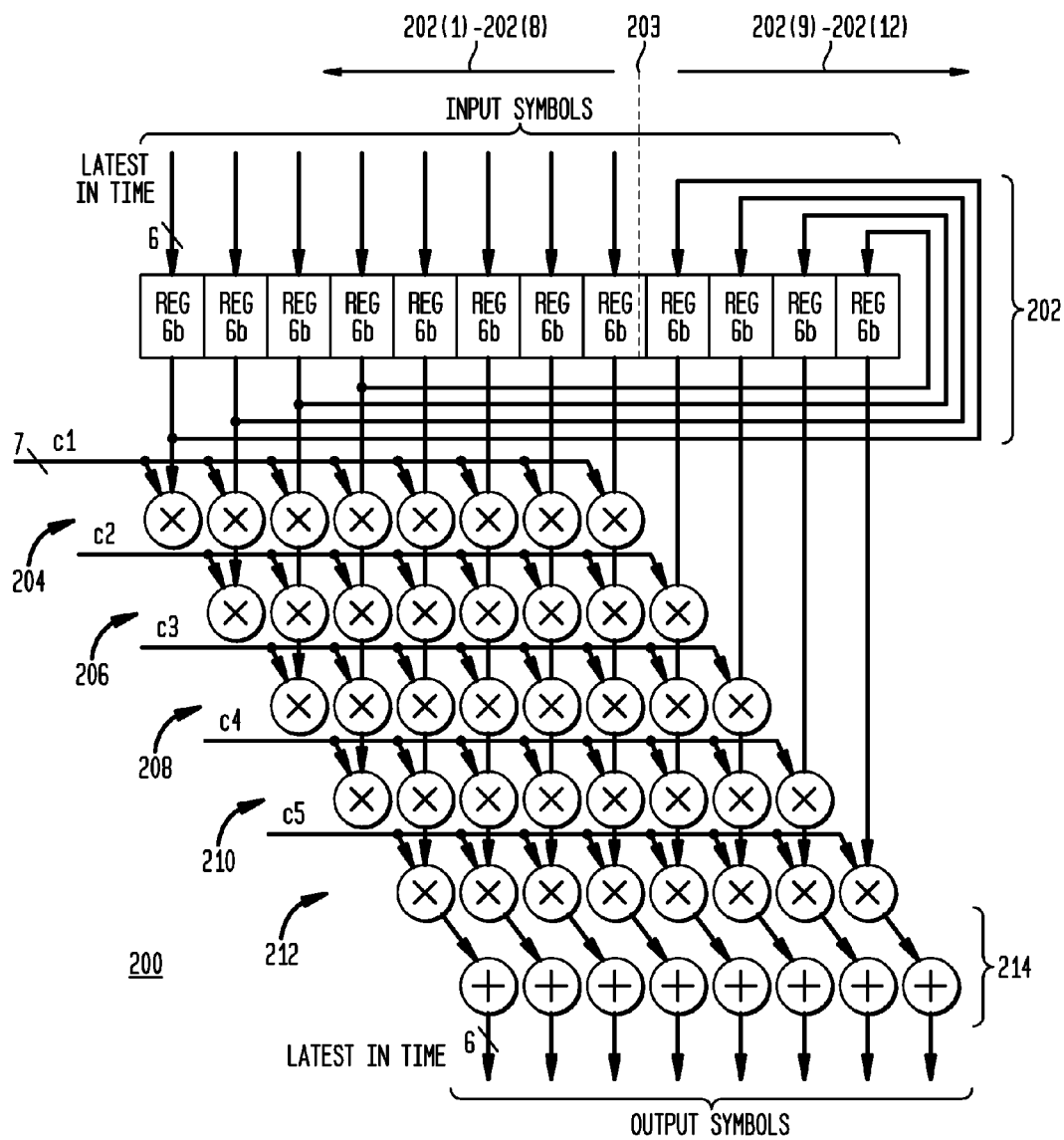
FIG. 2 shows an exemplary embodiment of an eight-way parallel fixed FFE stage that might be employed by the sparse, floating tap feed-forward equalization (FT-FFE) of FIG. 1.

FIG. 2 shows an exemplary embodiment of an eight-way parallel FT-FFE stage 200 that might be employed by the sparse, floating tap feed-forward equalization (e.g., FT-FFE 108 of FIG. 1) for fixed and floating stages. FT-FFE stage 200 contains 40 multipliers, implementing the product of 8 symbols with 5 tap coefficients. Input symbols (samples) are applied to register 202, where the first eight symbols are applied to the first eight register positions 202(1) through 202(8) (the symbol of register 202(1) contains the latest in time sample/symbol). The first four symbols (in 202(1) through 202(4)) are repeated and loaded into register positions 202(9) through 202(12), respectively. FT-FFE stage 200 further comprises five multiplier banks 204, 206, 208, 210, and 212. Each of multiplier banks 204, 206, 208, 210, and 212 receives eight input values, and multiplies the input values by a corresponding weighting (e.g., filter tap) coefficient $c_1$ through $c_5$. The first eight samples in register positions 202(1) through 202(8) are multiplied by coefficient $c_1$ in bank 204, the next multiplier bank 206 multiplies the next eight sample set in register positions 202(2) through 202(9) by coefficient $c_2$ in multiplier bank 206, and so on for coefficients $c_3$, $c_4$ and $c_5$ in multiplier banks 208, 210, and 212, respectively (i.e., each multiplier bank operates on a cyclic-shifted (to the left) set of the input eight symbols). Finally, the results for each symbol are combined in a corresponding one of adder bank 214 to provide the FFE-filtered eight symbols.

SerDes receiver equalizers typically operate with channels that tend to be time invariant, albeit different from system to system. The ISI distribution in such a channel might be estimated during a cold start of the receiver and anytime later on request. Significant ISI contributors are grouped on several pre-, on- and post-cursor positions, with a few moderate contributors scattered along the higher number post-cursor positions. Consequently, for efficient ISI cancellation, not all delay line taps might be required. As a result size and power savings are achieved by having just a few "floating" equalizer taps (e.g., 4 taps) that might be positioned at the most contributing ISI positions in the delay line in a given channel. Any of the existing floating taps search algorithms as known in the art might be employed in conjunction with embodiments of the present invention to find the highest contributing ISI positions during an automatic channel estimation procedure, on cold start, or at any time on request.

A long, for example, 50 taps, fixed taps FFE would require 50×5=250 multipliers, which is a relatively large number of multipliers. However, as employed herein, only selected sets of samples are employed for filtering by floating FFE stages corresponding to pre-, on- and post-cursor positions. The placement of the additional filter sections may be different for different channels, but correspond to elevated amplitudes in the channel response. An exemplary embodiment 300 for FT-FFE 108 shown in FIG. 1 and incorporating the FT-FFE stage 200 for fixed and floating stages is shown in FIG. 3.

Figure 3:
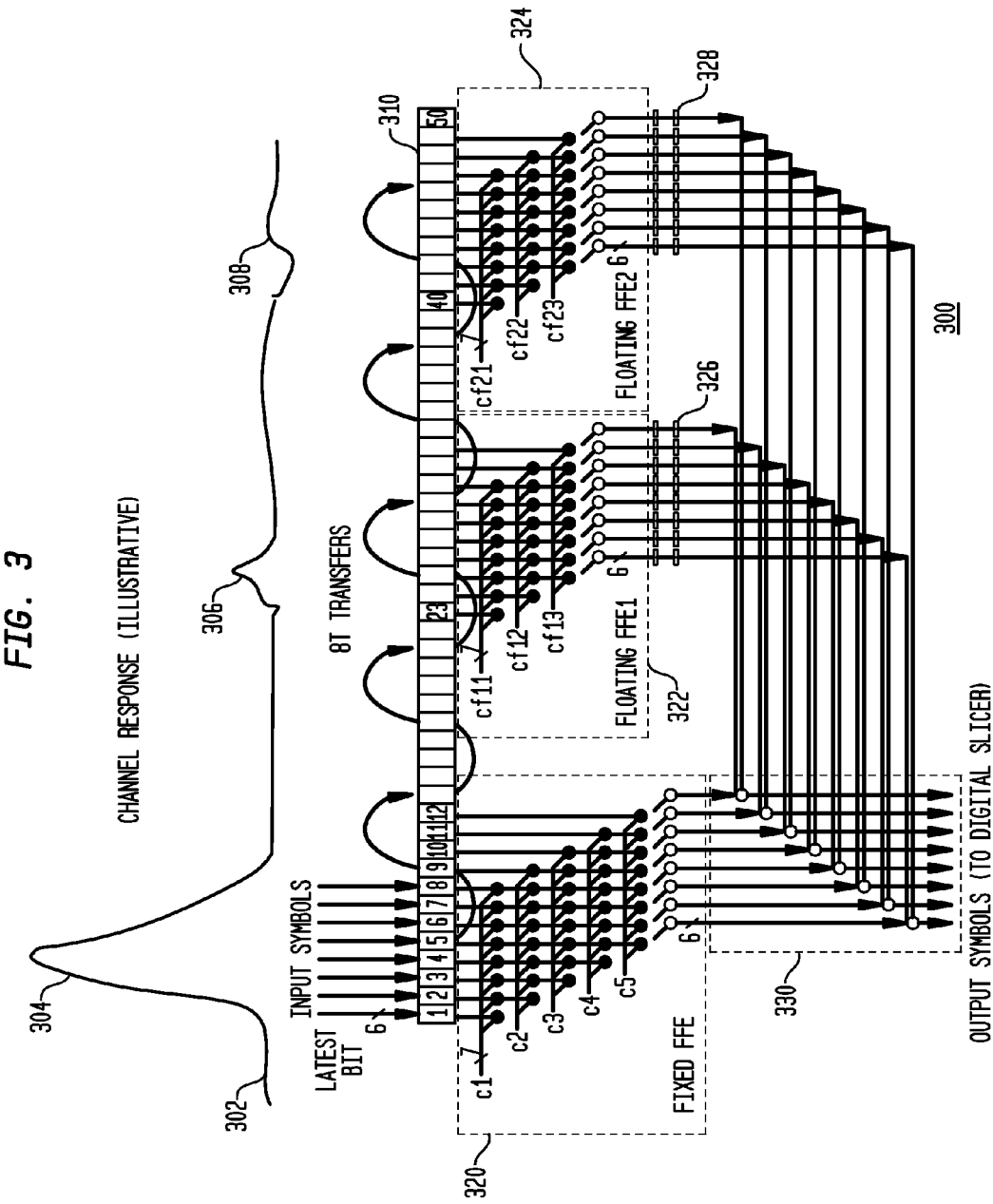
FIG. 3 shows an exemplary embodiment and corresponding channel response of the sparse, floating tap feed-forward equalization (FT-FFE) of FIG. 1.

At top in FIG. 3 is an illustration of a channel response 302 showing, in time, the first peak 304 and subsequent peaks 306 and 308 corresponding to estimated ISI cursor positions. Eight input samples are received into register 310 and cyclic copied into positions as described above to provide twelve symbol samples for the fixed FFE stage 320 corresponding in time to the channel response peak 304, which might be selected as the primary channel response peak. Former (earlier in time) symbols in 8-symbol period (8T) transfers are also provided, to yield fifty symbols in register 310. Further sets of ten symbols at register positions corresponding to subsequent peaks 306 and 308 are selected for floating tap processing with corresponding floating FT-FFE equivalent stages, shown as floating FFE1 322 and floating FFE2 324.

As shown in FIG. 3, floating FFE1 322 and floating FFE2 324 each employ three floating taps (e.g., cf11, cf12, cf13 and cf21, cf22, cf23, respectively). However, one skilled in the art would realize that more or less (in this, a maximum of eight for the eight-way parallel FT-FFE stage configuration shown) might be employed. Further, while the figure shows two floating FT-FFE stages, one or three or more might be employed depending on performance requirements of a given implementation. Therefore, embodiments of the invention does not limit the number of additional, "floating" filter sections nor their sizes i.e., number of symbols times number of taps), but ISI from far post-cursor positions is typically of relatively small amplitude and, at the same time, of a relatively narrow span when compared to the near-cursor positions, and so the number and size of the additional floating filter sections might be relatively small in size.

Returning to FIG. 3, partial results from fixed FFE 320, floating FFE1 322 and floating FFE2 324 are then combined, symbol-wise, by adding them together in combiner bank 330. In order to align the partial results in time, the output result sets of floating FFE1 322 and floating FFE2 324, which have fewer taps than the main FFE, have their partial results delayed on the respective outputs (shown as delay banks 326 and 328 corresponding to floating FFE1 322 and floating FFE2 324, respectively in FIG. 3) before combination in combiner bank 330. Since the FT-FFE stages corresponding to floating FFE1 322 and floating FFE2 324 are "floating," these filters might be re-configured and moved horizontally on the delay line if the estimated channel response changes. Any of a number of common channel characterization techniques in the art might be used to determine their positions. The eight, filtered symbols from combiner bank 330 are then provided to a decision device, such as a digital slicer.

Embodiments of the present invention employing a sparse, reconfigurable FFE might provide for the following advantages. Reconfigurable floating FFE equalizers take advantage of the nature of the impulse pulse responses of typical channels and apply to relatively sparse ISI contributors in far post-cursor positions, and offer the advantages of a full size FFE (covering the whole delay line) with much less hardware and power used. Since such FFE implementations might be implemented in the digital domain, hybrid or mixed signal circuitry is not necessarily required. Embodiments use a single phase clock, and scale approximately linearly with the number of ISI contributors in the channel, the width of the data path or the width of the coefficients. Such FFE implementations might be in-circuit reconfigurable, and further might be size-optimized due to a regular structure and few elementary components (adders, multipliers). Consequently, a sparse, reconfigurable FFE in accordance with the present invention combines the benefits of ISI cancellation by a long FFE with great power and size efficiency of floating tap architecture.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments of the present invention have been described with respect to processes of circuits, including possible implementation as a single integrated circuit, a multi-chip module, a single card, or a multi-card circuit pack, the present invention is not so limited. As would be apparent to one skilled in the art, various functions of circuit elements may also be implemented as processing blocks in a software program. Such software may be employed in, for example, a digital signal processor, micro-controller, or general purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

Unless explicitly stated otherwise, each numerical value and range should be interpreted as being approximate as if the word "about" or "approximately" preceded the value of the value or range.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Also for purposes of this description, the terms "couple," "coupling," "coupled." "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

It will be further understood that various changes in the details, materials, and arrangements of the parts which have been described and illustrated in order to explain the nature of this invention may be made by those skilled in the art without departing from the scope of the invention as expressed in the following claims.

We claim:

1. An apparatus for equalization to a set of samples of an input signal representing data symbols, the apparatus comprising:
   a set of delays coupled in series and configured to received the set of samples of the input signal, the set of delays comprising (1) a fixed-tap group configured to generate a fixed-tap sample group and (2) a floating-tap group configured to generate a floating-tap sample group;
   a fixed feed-forward equalizer (FFE) stage configured to apply a set of fixed filter taps to the fixed-tap sample group to generate a corresponding set of partial results;
   at least one floating FFE stage configured to apply an associated set of floating filter taps to selected ones of the floating-tap sample group to generate a corresponding set of partial results, wherein each floating FFE stage comprises a delay bank configured to adjust, in time, the corresponding set of partial results with the partial results of the fixed FFE stage;
   a combiner configured to combine the partial results of the fixed FFE stage with the partial results of each corresponding floating FFE stage, thereby generating a set of floating tap feed forward (FT-FFE) equalized samples of the input signal;
   a decision device configured to generate a set of data samples corresponding to the data symbols from the set of FT-FFE equalized samples of the input signal; and
   a decision feedback equalizer (DFE) configured to apply a DFE filter to the set of data samples, and a combiner configured to subtract the DFE-filtered set of data samples from the set of FT-FFE equalized samples of the input signal,
   wherein the fixed-tap sample group corresponds to the most recent ones, in time, of the set of samples of the input signal that are determined by a primary peak of a channel response for the input signal and wherein the selected ones of the floating-tap sample group are selected based on subsequent peaks of the channel response for the input signal.

2. The apparatus of claim 1, further comprising circuitry configured to generate an error signal corresponding to a weighted difference between the set of data samples and the set of FT-FFE equalized samples of the input signal.

3. The apparatus of claim 1, wherein the fixed FFE stage and each floating FFE stage is an N-way, parallel FFE, N a positive integer.

4. The apparatus of claim 1, wherein the set of delays is a register.

5. The apparatus of claim 1, wherein the apparatus is embodied in a Serializer-Deserializer (SerDes) device.

6. A method of applying equalization to a set of samples of an input signal representing data symbols, the method comprising:
   receiving, by a set of delays coupled in series, the set of samples of the input signal, the set of delays comprising (1) a fixed-tap group generating a fixed-tap sample group and (2) a floating-tap group generating a floating-tap sample group;
   applying, with a fixed feed-forward equalizer (FFE) stage, a set of fixed filter taps to the fixed-tap sample group, generating a corresponding set of partial results;
   applying, with at least one floating FFE stage, an associated set of floating filter taps to selected ones of the floating-tap sample group generating a corresponding set of partial results;
   adjusting, in time, for each floating FFE stage, with a delay bank, the corresponding set of partial results with the partial results of the fixed FFE stage;
   combining the partial results of the fixed FFE stage with the partial results of each corresponding floating FFE stage, thereby generating a set of floating tap feed forward (FT-FFE) equalized samples of the input signal;
   generating, by a decision device, a set of data samples corresponding to the data symbols from the set of FT-FFE equalized samples of the input signal; and
   applying, with a decision feedback equalizer (DFE), a DFE filter to the set of data samples, and a combiner configured to subtract the DFE-filtered set of data samples from the set of FT-FFE equalized samples of the input signal,
   wherein the fixed-tap sample group corresponds to the most recent ones, in time, of the set of samples of the input signal that are determined by a primary peak of a channel response for the input signal and wherein the selected ones of the floating-tap sample group are selected based on subsequent peaks of the channel response for the input signal.

7. The method of claim 6, further generating an error signal corresponding to a weighted difference between the set of data samples and the set of FT-FFE equalized samples of the input signal.

8. The method of claim 6, wherein for the applying with the fixed FFE stage and the applying with each floating FFE stage, each stage is an N-way, parallel FFE, N a positive integer.

9. The method of claim 6, wherein the receiving step receives with a register.

10. The method of claim 6, wherein the method is embodied as steps executed in a Serializer-Deserializer (SerDes) device.

11. A non-transitory machine-readable storage medium, having encoded thereon program code, wherein, when the program code is executed by a machine, the machine implements a method of applying equalization to a set of samples of an input signal representing data symbols, the method comprising the steps of:

receiving, by a set of delays coupled in series, the set of samples of the input signal, the set of delays comprising (1) a fixed-tap group generating a fixed-tap sample group and (2) a floating-tap group generating a floating-tap sample group;

applying, with a fixed feed-forward equalizer (FFE) stage, a set of fixed filter taps to the fixed-tap sample group, generating a corresponding set of partial results;

applying, with at least one floating FFE stage, an associated set of floating filter taps to selected ones of the floating-tap sample group generating a corresponding set of partial results;

adjusting, in time, for each floating FFE stage, with a delay bank, the corresponding set of partial results with the partial results of the fixed FFE stage;

combining the partial results of the fixed FFE stage with the partial results of each corresponding floating FFE stage, thereby generating a set of floating tap feed forward (FT-FFE) equalized samples of the input signal;

generating, by a decision device, a set of data samples corresponding to the data symbols from the set of FT-FFE equalized samples of the input signal; and applying, with a decision feedback equalizer (DFE), a DFE filter to the set of data samples, and a combiner configured to subtract the DFE-filtered set of data samples from the set of FT-FFE equalized samples of the input signal, wherein the fixed-tap sample group corresponds to the most recent ones, in time, of the set of samples of the input signal that are determined by a primary peak of a channel response for the input signal and wherein the selected ones of the floating-tap sample group are selected based on subsequent peaks of the channel response for the input signal.

* * * * *